US012429174B2

(12) United States Patent
An

(10) Patent No.: US 12,429,174 B2
(45) Date of Patent: Sep. 30, 2025

(54) PRESSURE VESSEL SUPPORT APPARATUS

(71) Applicants: HYUNDAI MOTOR COMPANY, Seoul (KR); Kia Corporation, Seoul (KR)

(72) Inventor: Ji Hyun An, Seoul (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 108 days.

(21) Appl. No.: 18/382,883

(22) Filed: Oct. 23, 2023

(65) Prior Publication Data

US 2025/0020285 A1 Jan. 16, 2025

(30) Foreign Application Priority Data

Jul. 13, 2023 (KR) ........................ 10-2023-0091235

(51) Int. Cl.
*F17C 13/08* (2006.01)

(52) U.S. Cl.
CPC .... *F17C 13/084* (2013.01); *F17C 2201/0109* (2013.01); *F17C 2205/0107* (2013.01); *F17C 2205/0192* (2013.01)

(58) Field of Classification Search
CPC ............ F17C 13/084; F17C 2201/0109; F17C 2205/0107; F17C 2205/0192
See application file for complete search history.

(56) References Cited

U.S. PATENT DOCUMENTS

| | | | | |
|---|---|---|---|---|
| 2,344,513 | A * | 3/1944 | Mapes | F17C 13/084 109/57 |
| 5,429,268 | A * | 7/1995 | Hale | F17C 1/00 220/582 |
| 10,047,910 | B2 * | 8/2018 | Chung | F16B 2/06 |
| 10,696,154 | B2 * | 6/2020 | Arold | F17C 13/083 |
| 12,091,300 | B2 * | 9/2024 | Woo | F17C 13/08 |
| 12,092,264 | B2 * | 9/2024 | Fujii | F17C 1/06 |
| 12,092,265 | B2 * | 9/2024 | Woo | F17C 13/084 |
| 12,259,091 | B2 * | 3/2025 | Ohba | F17C 13/084 |
| 2022/0205594 | A1 * | 6/2022 | Woo | F17C 13/08 |
| 2023/0151870 | A1 * | 5/2023 | Xiao | F16F 7/01 188/268 |
| 2024/0271761 | A1 * | 8/2024 | Warlick, Jr. | F17C 13/084 |

FOREIGN PATENT DOCUMENTS

| | | | | |
|---|---|---|---|---|
| DE | 102015116450 | A1 * | 4/2016 | B60K 15/067 |
| JP | 4179128 | B2 | 11/2008 | |
| JP | 6766745 | B2 | 9/2020 | |

* cited by examiner

*Primary Examiner* — Eret C McNichols
(74) *Attorney, Agent, or Firm* — MORGAN, LEWIS & BOCKIUS LLP

(57) ABSTRACT

A pressure vessel support apparatus includes a first side member configured to be coupled to an object, a second side member spaced from the first side member, and a cross-frame portion connecting the first side member and the second side member and supporting a pressure vessel between the first side member and the second side member, obtaining an advantageous effect of simplifying a structure and improving spatial utilization and a degree of design freedom.

16 Claims, 8 Drawing Sheets

PRESSURE VESSEL SUPPORT APPARATUS

CROSS-REFERENCE TO RELATED APPLICATION

The present application claims priority to Korean Patent Application No. 10-2023-0091235 filed on Jul. 13, 2023, the entire contents of which is incorporated herein for all purposes by this reference.

BACKGROUND OF THE PRESENT DISCLOSURE

Field of the Present Disclosure

The present disclosure relates to a pressure vessel support apparatus, and more particularly, to a pressure vessel support apparatus capable of including a simplified structure and improving spatial utilization and a degree of design freedom.

Description of Related Art

A hydrogen vehicle is configured to produce electricity by a chemical reaction between hydrogen and oxygen and to travel by driving a motor. The hydrogen vehicle includes a pressure vessel configured to store hydrogen ($H_2$), a fuel cell stack configured to produce electricity by an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

A TYPE 4 pressure vessel may be used as the pressure vessel of the hydrogen vehicle. The TYPE 4 pressure vessel may include a liner (e.g., a nonmetallic material), and a carbon fiber layer made by winding a carbon fiber composite material around an external surface of the liner.

Meanwhile, recently, there have been made attempts to mount a pressure vessel in a space between side members (or side frames) of a hydrogen vehicle to ensure spatial utilization while ensuring traveling stability (ensuring a rear visual field) of the hydrogen vehicle (e.g., a hydrogen truck).

However, generally, a separate support apparatus needs to be provided to support the pressure vessel in the space between the side members, which complicates the structure. Furthermore, a predetermined or larger size of the space for installing the support apparatus needs to be ensured, which degrades the spatial utilization and the degree of design freedom.

Moreover, generally, both the pressure vessel and the support apparatus need to be provided together in the space between the side members, which makes it difficult to increase a size (volume) of the pressure vessel to a predetermined size (volume) or larger and to increase a traveling distance of the vehicle.

Therefore, recently, various studies have been conducted to simplify a structure for supporting (fixing) a pressure vessel and improve spatial utilization and a degree of design freedom, but the study results are still insufficient. Accordingly, there is a need to develop a technology to simplify a structure for supporting (fixing) a pressure vessel and improve spatial utilization and a degree of design freedom.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

The present disclosure has been made in an effort to provide a pressure vessel support apparatus capable of including a simplified structure and improving spatial utilization and a degree of design freedom.

Various aspects of the present disclosure are directed to providing a pressure vessel by a cross-frame portion configured to support a side member.

Among other things, the present disclosure has been made in an effort to provide the pressure vessel support apparatus in which the cross-frame portion is configured to support the pressure vessel while serving to support the side members so that the pressure vessel may be mounted in a space between the side members without a separate pressure vessel support apparatus.

The present disclosure has also been made in an effort to selectively change a mode and frequency of the side member by selectively adjusting a size of the cross-frame portion.

The present disclosure has also been made in an effort to increase a storage capacity of the pressure vessel (the amount of hydrogen to be stored) and increase a traveling distance of a vehicle.

The present disclosure has also been made in an effort to improve structural rigidity, stability, and reliability.

An exemplary embodiment of the present disclosure provides a pressure vessel support apparatus including: a first side member configured to be coupled to an object; a second side member spaced from the first side member; and a cross-frame portion connecting the first side member and the second side member and supporting a pressure vessel between the first side member and the second side member.

This is to simplify a structure and improve spatial utilization and a degree of design freedom.

That is, generally, a separate support apparatus needs to be provided to support the pressure vessel in the space between the side members, which complicates the structure. Furthermore, a predetermined or larger size of the space for installing the support apparatus needs to be ensured, which degrades the spatial utilization and the degree of design freedom. Moreover, generally, both the pressure vessel and the support apparatus need to be provided together in the space between the side members, which makes it difficult to increase a size (volume) of the pressure vessel to a predetermined size (volume) or larger and to increase a traveling distance of the vehicle.

In contrast, according to the exemplary embodiment of the present disclosure, the pressure vessel may be supported by the cross-frame portion that connects the first side member and the second side member. Therefore, it is possible to obtain an advantageous effect of simplifying the structure and improving the spatial utilization and the degree of design freedom.

According to the exemplary embodiment of the present disclosure, the cross-frame portion inherently is configured to support the first side member and the second side member and is also configured to support the pressure vessel so that the pressure vessel may be mounted (supported and fixed) in the space between the first side member and the second side member without a separate pressure vessel support apparatus.

The cross-frame portion may have various structures configured for supporting the pressure vessel between the first side member and the second side member while connecting the first side member and the second side member in the leftward/rightward direction of the object.

According to the exemplary embodiment of the present disclosure, the cross-frame portion may include: a first cross-member configured to connect the first side member and the second side member and surround one portion of an external peripheral surface of the pressure vessel; and a second cross-member configured to connect the first side member and the second side member and surround the other portion of the external peripheral surface of the pressure vessel.

According to the exemplary embodiment of the present disclosure, the first cross-member may include a first curved surface seating portion, and the external peripheral surface of the pressure vessel may be accommodated on the first curved surface seating portion.

As described above, in the exemplary embodiment of the present disclosure, the pressure vessel is in close contact (surface contact) with the first curved surface seating portion. Therefore, it is possible to obtain an advantageous effect of more stably maintaining the arrangement state of the pressure vessel with respect to the first cross-member and minimizing the movement and swaying of the pressure vessel.

According to the exemplary embodiment of the present disclosure, the second cross-member may include a second curved surface seating portion, and the external peripheral surface of the pressure vessel may be accommodated on the second curved surface seating portion.

As described above, in the exemplary embodiment of the present disclosure, the pressure vessel is in close contact (surface contact) with the second curved surface seating portion. Therefore, it is possible to obtain an advantageous effect of more stably maintaining the arrangement state of the pressure vessel with respect to the second cross-member and minimizing the movement and swaying of the pressure vessel.

According to the exemplary embodiment of the present disclosure, the cross-frame portion may be configured to be selectively movable between the first side member and the second side member in a longitudinal direction of the pressure vessel.

Because the cross-frame portion is movable in the longitudinal direction of the pressure vessel as described above, the cross-frame portion may be disposed at an optimal position at which the cross-frame portion may stably support the pressure vessel in response to the size of the pressure vessel.

According to the exemplary embodiment of the present disclosure, the pressure vessel support apparatus may include: a first side fastening hole formed in at least one of the first and second side members; a first fastening hole formed in the first cross-member while corresponding to the first side fastening hole; a first fastening member fastened to the first side fastening hole and the first fastening hole; a second side fastening hole formed in at least one of the first and second side members; a second fastening hole formed in the second cross-member while corresponding to the second side fastening hole; and a second fastening member fastened to the second side fastening hole and the second fastening hole.

According to the exemplary embodiment of the present disclosure, the first side fastening hole may be provided as a plurality of first side fastening holes spaced from one another in the longitudinal direction of the pressure vessel, and the second side fastening hole may be provided as a plurality of second side fastening holes spaced from one another in the longitudinal direction of the pressure vessel.

As described above, in the exemplary embodiment of the present disclosure, the plurality of first side fastening holes are spaced from one another in the longitudinal direction of the pressure vessel, and the plurality of second side fastening holes are spaced from one another in the longitudinal direction of the pressure vessel. Therefore, the cross-frame portion may be disposed at the optimal position at the cross-frame portion may stably support the pressure vessel in response to the size of the pressure vessel, and then the cross-frame portion may be fixed to respect to the first side member and the second side member.

According to the exemplary embodiment of the present disclosure, the first and second cross-members may collectively surround the entire external peripheral surface of the pressure vessel.

According to the exemplary embodiment of the present disclosure, at least one of the first and second cross-members may include: a first movable cross-member; and a second movable cross-member configured to be selectively movable toward or away from the first movable cross-member in a longitudinal direction of the pressure vessel.

According to the exemplary embodiment of the present disclosure, eigenmode frequencies of the first and second side members may be selectively changed based on the movement of the second movable cross-member relative to the first movable cross-member (the movement toward or away from the first movable cross-member).

As described above, in the exemplary embodiment of the present disclosure, the eigenmode frequencies of the first and second side members are selectively changed based on the movement of the second movable cross-member relative to the first movable cross-member (a distance between the first movable cross-member and the second movable cross-member). Therefore, it is possible to obtain an advantageous effect of minimizing (suppressing) resonance of the first and second side members caused by an external vibration (e.g., a vibration of a road surface) without replacing the cross-frame (e.g., the first cross-member).

The movement of the second movable cross-member relative to the first movable cross-member may be implemented in various ways in accordance with required conditions and design specifications.

According to the exemplary embodiment of the present disclosure, the pressure vessel support apparatus may include: a movement member configured to selectively move the second movable cross-member toward or away from the first movable cross-member.

According to the exemplary embodiment of the present disclosure, the pressure vessel support apparatus may include: a first screw hole formed in the first movable cross-member and screw-fastened to one end portion of the movement member; and a second screw hole formed in the second movable cross-member and screw-fastened to the other end portion of the movement member, in which the first movable cross-member and the second movable cross-member may move toward or away from each other in response to a rotation of the movement member.

According to the exemplary embodiment of the present disclosure, a maximum spacing distance of the second movable cross-member from the first movable cross-member may be defined within a maximum length of the pressure vessel in the longitudinal direction of the pressure vessel.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
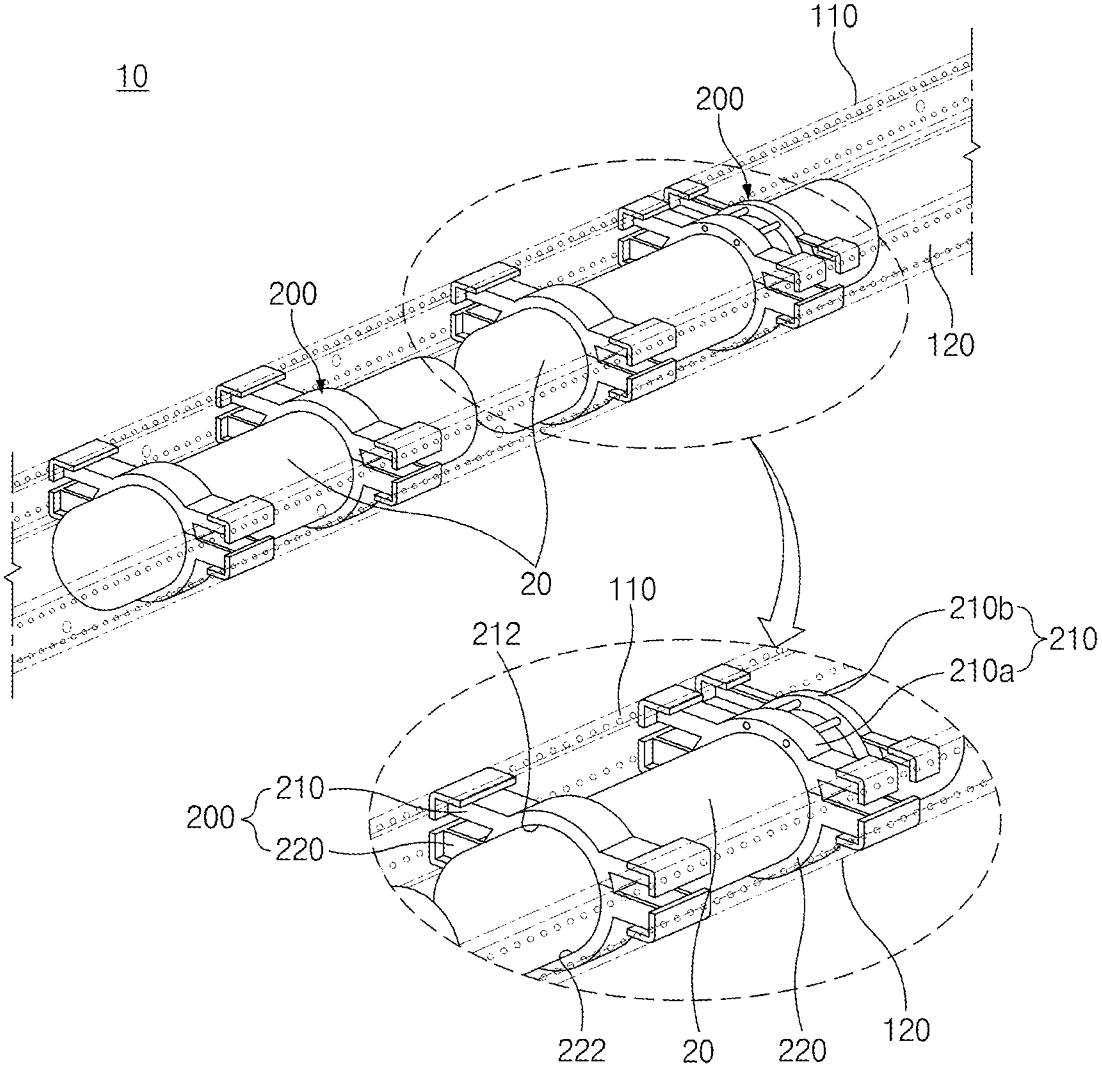
FIG. 1 is a perspective view for explaining a pressure vessel support apparatus according to an exemplary embodiment of the present disclosure.
Figure 2:
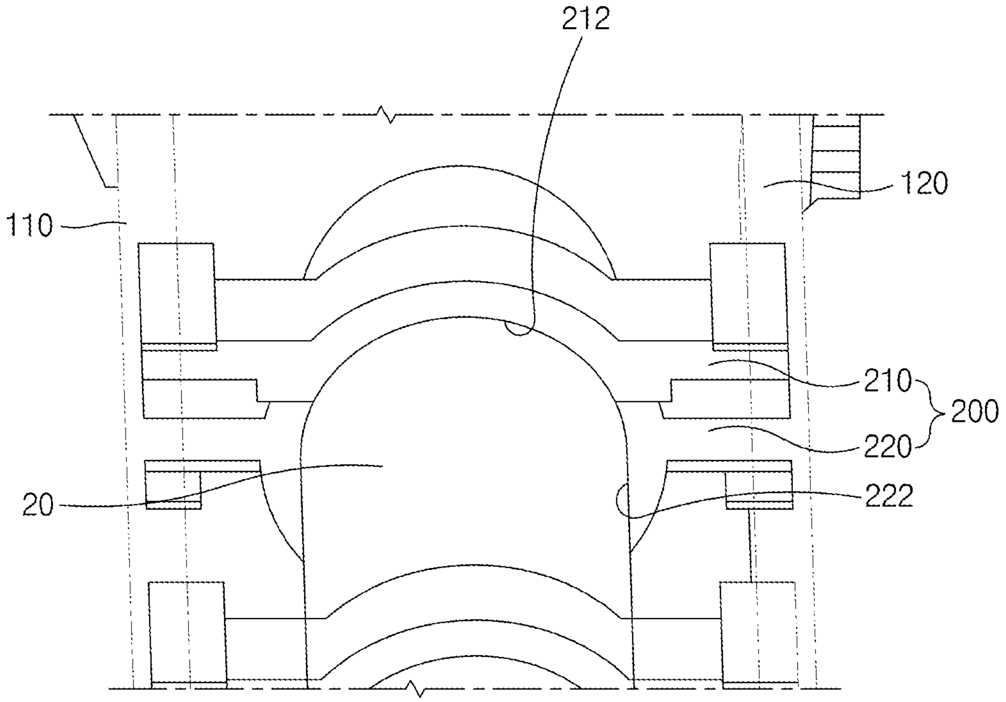
FIG. 2 is a view for explaining a cross-frame portion of the pressure vessel support apparatus according to the exemplary embodiment of the present disclosure.

It may be understood that the appended drawings are not necessarily to scale, presenting a somewhat simplified representation of various features illustrative of the basic principles of the present disclosure. The predetermined design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

However, the technical spirit of the present disclosure is not limited to various exemplary embodiments described herein but may be implemented in various different forms. At least one of the constituent elements in the exemplary embodiments of the present disclosure may be selectively combined and substituted for use within the scope of the technical spirit of the present disclosure.

Furthermore, unless otherwise and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted based on the contextual meanings of the related technology.

Furthermore, the terms used in the exemplary embodiments of the present disclosure are for explaining the embodiments, not for limiting the present disclosure.

In the present specification, unless stated otherwise, a singular form may also include a plural form. The expression "at least one (or one or more) of A, B, and C" may include one or more of all combinations that may be made by combining A, B, and C.

Furthermore, the terms such as first, second, A, B, (a), and (b) may be used to describe constituent elements of the exemplary embodiments of the present disclosure.

These terms are used only for discriminating one constituent element from another constituent element, and the nature, the sequences, or the orders of the constituent elements are not limited by the terms.

Furthermore, when one constituent element is described as being 'connected', 'coupled', or 'attached' to another constituent element, one constituent element may be connected, coupled, or attached directly to another constituent element or connected, coupled, or attached to another constituent element through yet another constituent element interposed therebetween.

Furthermore, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

With reference to FIG. 1, FIG. 2, FIG. 3, FIG. 4, FIG. 5, FIG. 6, FIG. 7, and FIG. 8, a pressure vessel support apparatus 10 according to an exemplary embodiment of the present disclosure includes a first side member 110 provided on an object, a second side member 120 provided to be spaced from the first side member 110, and cross-frame portions 200 each configured to connect the first side member 110 and the second side member 120 and support a pressure vessel 20 between the first side member 110 and the second side member 120.

For reference, the pressure vessel support apparatus 10 according to the exemplary embodiment of the present disclosure may be used to support the pressure vessel 20 on various objects each including the side members (the first and second side members). The present disclosure is not restricted or limited by the type and structure of the object.

For example, the pressure vessel support apparatus 10 according to the exemplary embodiment of the present disclosure may be used to support and fix the pressure vessel 20 in a vehicle (e.g., a passenger vehicle or a commercial vehicle) including the side members (the first and second side members).

Hereinafter, an example will be described in which the pressure vessel support apparatus 10 according to the exemplary embodiment of the present disclosure is applied to a truck (object).

The pressure vessel 20 is configured to store a target fluid (e.g., high-pressure pressurized hydrogen).

The pressure vessel 20 may have various structures configured for storing the target fluid. The present disclosure is not restricted or limited by the type and structure of the pressure vessel 20.

For example, the pressure vessel 20 may include a liner, a carbon fiber layer provided to surround an external surface of the liner, and a fiberglass layer provided to surround an external surface of the carbon fiber layer.

Hereinafter, an example will be described in which the pressure vessel 20 includes an accommodation space having a circular cross-section. According to another exemplary embodiment of the present disclosure, the pressure vessel may include a quadrangular cross-sectional shape or other cross-sectional shapes.

With reference to FIG. 1, FIG. 2, FIG. 3, and FIG. 4, the first side member 110 is provided on the object in a forward/rearward direction of the object to prevent the object from being warped and bent in the forward/rearward and leftward/rightward directions while ensuring structural rigidity of a vehicle body of the object.

The first side member 110 may have various structures in accordance with required conditions and design specifications. The present disclosure is not restricted or limited by the structure and shape of the first side member 110.

For example, the first side member 110 may include an approximately "⊏"-shaped cross-section. Alternatively, the first side member 110 may include an "I"-shaped cross-section or other cross-sectional shapes.

The second side member 120 is provided on the object and spaced from the first side member 110 to prevent the object from being warped and bent in the forward/rearward and leftward/rightward directions of the vehicle body of the object while ensuring the structural rigidity of the vehicle body of the object.

The second side member 120 may have various structures in accordance with required conditions and design specifications. The present disclosure is not restricted or limited by the structure and shape of the second side member 120.

For example, the second side member 120 may include an approximately "⊏"-shaped cross-section. Alternatively, the second side member 120 may include an "I"-shaped cross-section or other cross-sectional shapes.

With reference to FIG. 1, FIG. 2, FIG. 3, and FIG. 4, the cross-frame portion 200 is provided to prevent the object from being warped and bent in the forward/rearward and leftward/rightward directions of the vehicle body and to support the pressure vessel 20 between the first side member 110 and the second side member 120 while ensuring the structural rigidity of the vehicle body of the object together with the first side member 110 and the second side member 120.

In the instant case, the configuration in which the cross-frame portion 200 supports the pressure vessel 20 may be understood as a configuration in which the cross-frame portion 200 fixes the pressure vessel 20 so that the pressure vessel 20 does not move between the first side member 110 and the second side member 120 or separate from a portion between the first side member 110 and the second side member 120.

The number of cross-frame portions 200 and a spacing interval between the cross-frame portions 200 may be variously changed in accordance with required conditions and design specifications. The present disclosure is not restricted or limited by the number of cross-frame portions 200 and the spacing interval between the cross-frame portions 200.

Hereinafter, an example will be described in which the plurality of pressure vessels 20 is provided between the first side member 110 and the second side member 120, and the pressure vessels 20 are each supported by the plurality of (e.g., two) cross-frame portions 200. According to another exemplary embodiment of the present disclosure, the pressure vessels may each be supported by a single cross-frame portion.

The cross-frame portion 200 may have various structures configured for supporting the pressure vessel 20 between the first side member 110 and the second side member 120 while connecting the first side member 110 and the second side member 120 in the leftward/rightward direction of the object. The present disclosure is not restricted or limited by the structure of the cross-frame portion 200.

According to the exemplary embodiment of the present disclosure, the cross-frame portion 200 may include a first cross-member 210 configured to connect the first side member 110 and the second side member 120 and provided to surround one portion of an external peripheral surface of the pressure vessel 20, and a second cross-member 220 configured to connect the first side member 110 and the second side member 120 and provided to the other portion of the external peripheral surface of the pressure vessel 20.

Hereinafter, an example will be described in which the first cross-member 210 supports an upper portion of the pressure vessel 20 based on the upward/downward direction (gravitational direction), and the second cross-member 220 supports a lower portion of the pressure vessel 20 based on the upward/downward direction (gravitational direction). According to another exemplary embodiment of the present disclosure, the first cross-member may be configured to support the lower portion of the pressure vessel, and the second cross-member may be configured to support the upper portion of the pressure vessel.

For reference, in the exemplary embodiment of the present disclosure illustrated and described above, the example has been described in which the cross-frame portion 200 includes the two cross-members (the first cross-member and the second cross-member). However, according to another exemplary embodiment of the present disclosure, the cross-frame portion may include three or more cross-members or only a single cross-member.

The first cross-member 210 may have various structures configured for connecting the first side member 110 and the second side member 120 and surrounding a portion of the external peripheral surface of the pressure vessel 20 (e.g., the upper portion of the pressure vessel). The present disclosure is not restricted or limited by the structure and shape of the first cross-member 210.

For example, the first cross-member 210 may include an approximately straight shape and be located between the first side member 110 and the second side member 120.

One end portion of the first cross-member 210 may be in close contact with an internal surface of the first side member 110 that faces the second side member 120, and the other end portion of the first cross-member 210 may be in close contact with an internal surface of the second side member 120 that faces the first side member 110. A portion of the external peripheral surface of the pressure vessel 20 (e.g., the upper portion of the pressure vessel 20) may be supported by the first cross-member 210.

According to the exemplary embodiment of the present disclosure, the first cross-member 210 may include a first curved surface seating portion 212, and the external peripheral surface of the pressure vessel 20 may be accommodated on the first curved surface seating portion 212.

For example, the first curved surface seating portion 212 may be defined to include a shape corresponding to the external peripheral surface of the pressure vessel 20, and the external peripheral surface of the pressure vessel 20 may be in close contact (surface contact) with the first curved surface seating portion 212.

As described above, in the exemplary embodiment of the present disclosure, the pressure vessel 20 is in close contact (surface contact) with the first curved surface seating portion 212. Therefore, it is possible to obtain an advantageous effect of more stably maintaining the arrangement state of the pressure vessel 20 with respect to the first cross-member 210 and minimizing the movement and swaying of the pressure vessel 20.

According to another exemplary embodiment of the present disclosure, the first curved surface seating portion may include a semicircular shape. Alternatively, the pressure vessel may be configured to be in line contact or point contact with the first curved surface seating portion.

The second cross-member 220 may have various structures configured for connecting the first side member 110 and the second side member 120 and surrounding the other portion of the external peripheral surface of the pressure vessel 20 (e.g., the lower portion of the pressure vessel). The present disclosure is not restricted or limited by the structure and shape of the second cross-member 220.

For example, the second cross-member 220 may include an approximately straight shape and be located between the first side member 110 and the second side member 120.

One end portion of the second cross-member 220 may be in close contact with the internal surface of the first side member 110 that faces the second side member 120, and the other end portion of the second cross-member 220 may be in close contact with the internal surface of the second side member 120 that faces the first side member 110. The other portion of the external peripheral surface of the pressure vessel 20 (e.g., the lower portion of the pressure vessel) may be supported by the second cross-member 220.

According to the exemplary embodiment of the present disclosure, the second cross-member 220 may include a second curved surface seating portion 222, and the external peripheral surface of the pressure vessel 20 may be accommodated on the second curved surface seating portion 222.

For example, the second curved surface seating portion 222 may be defined to include a shape corresponding to the external peripheral surface of the pressure vessel 20, and the external peripheral surface of the pressure vessel 20 may be in close contact (surface contact) with the second curved surface seating portion 222.

The first cross-member 210 and the second cross-member 220 may be provided to collectively surround the entire external peripheral surface of the pressure vessel 20. For example, the second curved surface seating portion 222 and the first curved surface seating portion 212 may be provided to collectively define a shape of a circle and surround the entire external peripheral surface of the pressure vessel 20.

As described above, in the exemplary embodiment of the present disclosure, the pressure vessel 20 is in close contact (surface contact) with the second curved surface seating portion 222. Therefore, it is possible to obtain an advantageous effect of more stably maintaining the arrangement state of the pressure vessel 20 with respect to the second cross-member 220 and minimizing the movement and swaying of the pressure vessel 20.

Moreover, in the exemplary embodiment of the present disclosure, the entire external peripheral surface of the pressure vessel 20 is in close contact with the first cross-member 210 and the second cross-member 220 so that the structural rigidity of the pressure vessel 20 may be imparted to the first cross-member 210 and the second cross-member 220. Therefore, it is possible to obtain an advantageous effect of further improving overall bending/torsional rigidity of the vehicle body of the object.

According to another exemplary embodiment of the present disclosure, the second curved surface seating portion may include a semicircular shape. Alternatively, the pressure vessel may be configured to be in line contact or point contact with the second curved surface seating portion.

According to the exemplary embodiment of the present disclosure, the cross-frame portion 200 may be configured to be selectively movable between the first side member 110 and the second side member 120 in a longitudinal direction of the pressure vessel 20 (i.e., a longitudinal direction of the first side member).

Because the cross-frame portion 200 is movable in the longitudinal direction of the pressure vessel 20 as described above, the cross-frame portion 200 may be disposed at an optimal position at which the cross-frame portion 200 may stably support the pressure vessel 20 in response to the size of the pressure vessel 20.

The arrangement state of the cross-frame portion 200 with respect to the side members (the first and second side members) may be fixed in various ways in accordance with required conditions and design specifications. The present disclosure is not restricted or limited by the structure for fixing the cross-frame portion 200 with respect to the side members.

Figure 3:
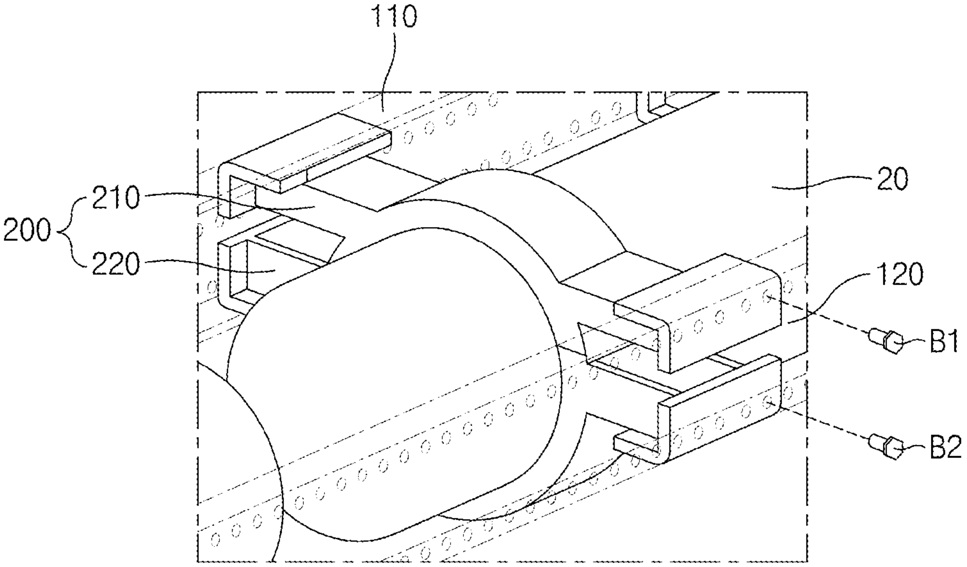
FIG. 3 and FIG. 4 are views for explaining first and second cross-members of the pressure vessel support apparatus according to the exemplary embodiment of the present disclosure.
Figure 4:
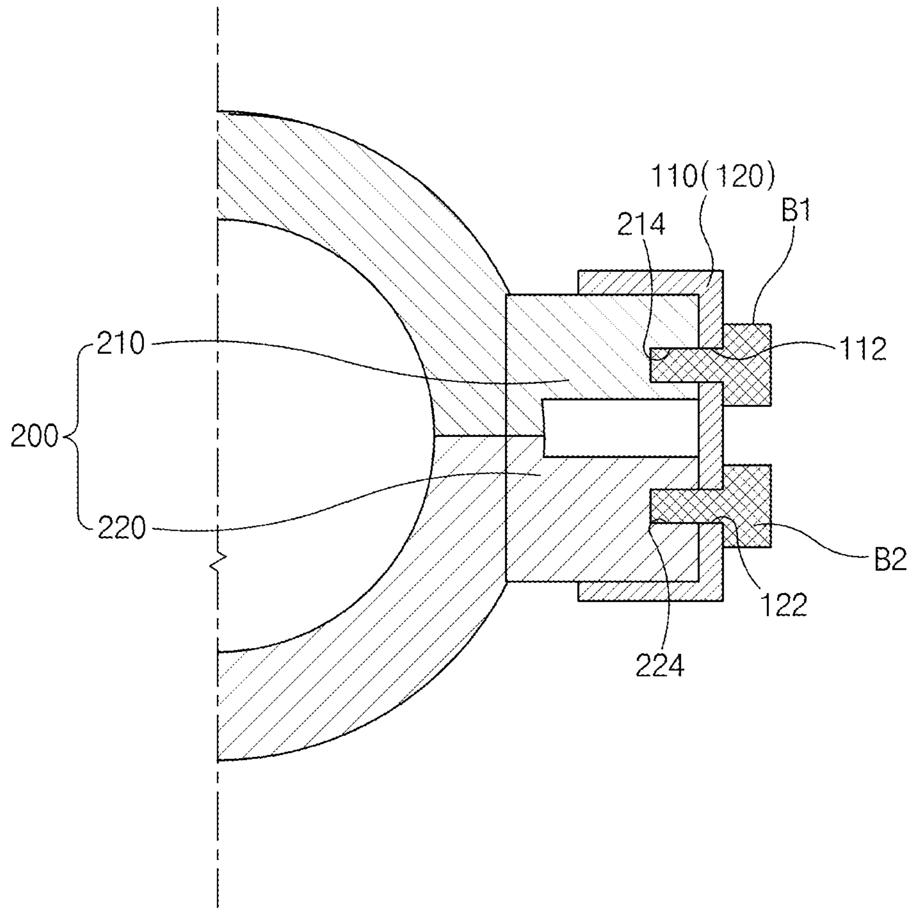

With reference to FIG. 3 and FIG. 4, according to the exemplary embodiment of the present disclosure, the pressure vessel support apparatus 10 may include first side fastening holes 112 provided in at least one of the first side member 110 and the second side member 120, first fastening holes 214 provided in the first cross-member 210 while corresponding to the first side fastening holes 112, first fastening members B1 fastened to the first side fastening holes 112 and the first fastening holes 214, second side fastening holes 122 provided in at least one of the first side member 110 and the second side member 120, second fastening holes 224 provided in the second cross-member 220 while corresponding to the second side fastening holes 122, and second fastening members B2 fastened to the second side fastening holes 122 and the second fastening holes 224.

Hereinafter, an example will be described in which the first side fastening holes 112 are respectively provided in the first side member 110 and the second side member 120 to face one another, and the second side fastening holes 122 are respectively provided in the first side member 110 and the second side member 120 to face one another and positioned below the first side fastening holes 112.

Screw thread portions may be provided on an internal peripheral surface of the first side fastening hole 112 and an internal peripheral surface of the first fastening hole 214, and the first fastening member B1 may be screw-fastened to the screw thread portions. In a state in which the first fastening hole 214 is aligned with (aligned to communicate with) the first side fastening hole 112, the first fastening member B1 (e.g., a bolt member) is screw-fastened to the first side fastening hole 112 and the first fastening hole 214 so that the arrangement state of the first cross-member 210 with respect to the first side member 110 and the second side member 120 may be fixed.

Likewise, screw thread portions may be provided on an internal peripheral surface of the second side fastening hole 122 and an internal peripheral surface of the second fastening hole 224, and the second fastening member B2 may be screw-fastened to the screw thread portions. In a state in which the second fastening hole 224 is aligned with (aligned to communicate with) the second side fastening hole 122, the second fastening member B2 (e.g., a bolt member) is screw-fastened to the second side fastening hole 122 and the second fastening hole 224 so that the arrangement state of the second cross-member 220 with respect to the first side member 110 and the second side member 120 may be fixed.

According to the exemplary embodiment of the present disclosure, the first side fastening hole 112 may be provided as a plurality of first side fastening holes 112 spaced from one another at predetermined intervals in the longitudinal direction of the pressure vessel 20 (the longitudinal direction of the first side member), and the second side fastening hole 122 may be provided as a plurality of second side fastening holes 122 spaced from one another at predetermined intervals in the longitudinal direction of the pressure vessel 20.

As described above, in the exemplary embodiment of the present disclosure, the plurality of first side fastening holes 112 are spaced from one another in the longitudinal direction of the pressure vessel 20, and the plurality of second side fastening holes 122 are spaced from one another in the longitudinal direction of the pressure vessel 20. Therefore, the cross-frame portion 200 may be disposed at the optimal position at the cross-frame portion 200 may stably support the pressure vessel 20 in response to the size of the pressure vessel 20, and then the cross-frame portion 200 may be fixed to respect to the first side member 110 and the second side member 120.

The process of mounting the pressure vessel 20 on the side members (the first side member 110 and the second side member 120) may be variously changed in accordance with required conditions and design specifications. The present disclosure is not restricted or limited by the process and sequence of mounting the pressure vessel 20.

According to the exemplary embodiment of the present disclosure, after the second cross-member 220 is mounted on the first side member 110 and the second side member 120, the pressure vessel 20 is accommodated on the second cross-member 220, and the first cross-member 210 is mounted on the first side member 110 and the second side member 120. Therefore, the cross-frame portion 200 may inherently are configured to support the first side member 110 and the second side member 120 and also serve as a support device for supporting the pressure vessel 20.

Figure 5:
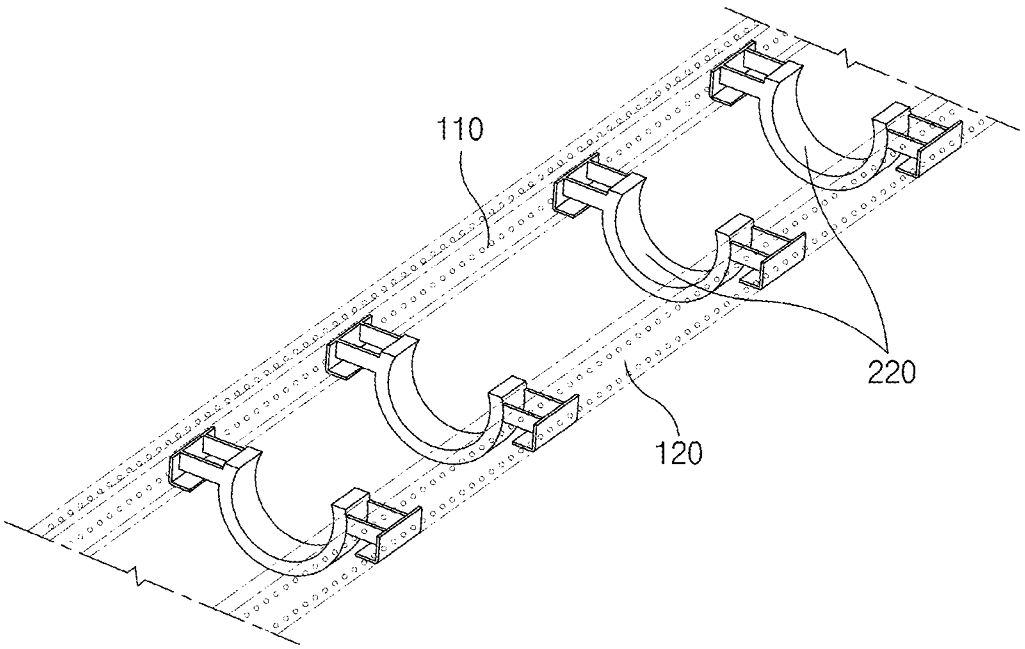
FIG. 5, FIG. 6 and FIG. 7 are views for explaining a process of mounting a pressure vessel by use of the pressure vessel support apparatus according to the exemplary embodiment of the present disclosure.

That is, with reference to FIG. 5, the second cross-member 220 may be mounted first on the first side member 110 and the second side member 120. The second cross-member 220 may be fixed by the second fastening member B2 in the state in which the second cross-member 220 is disposed between the first side member 110 and the second side member 120.

Figure 6:
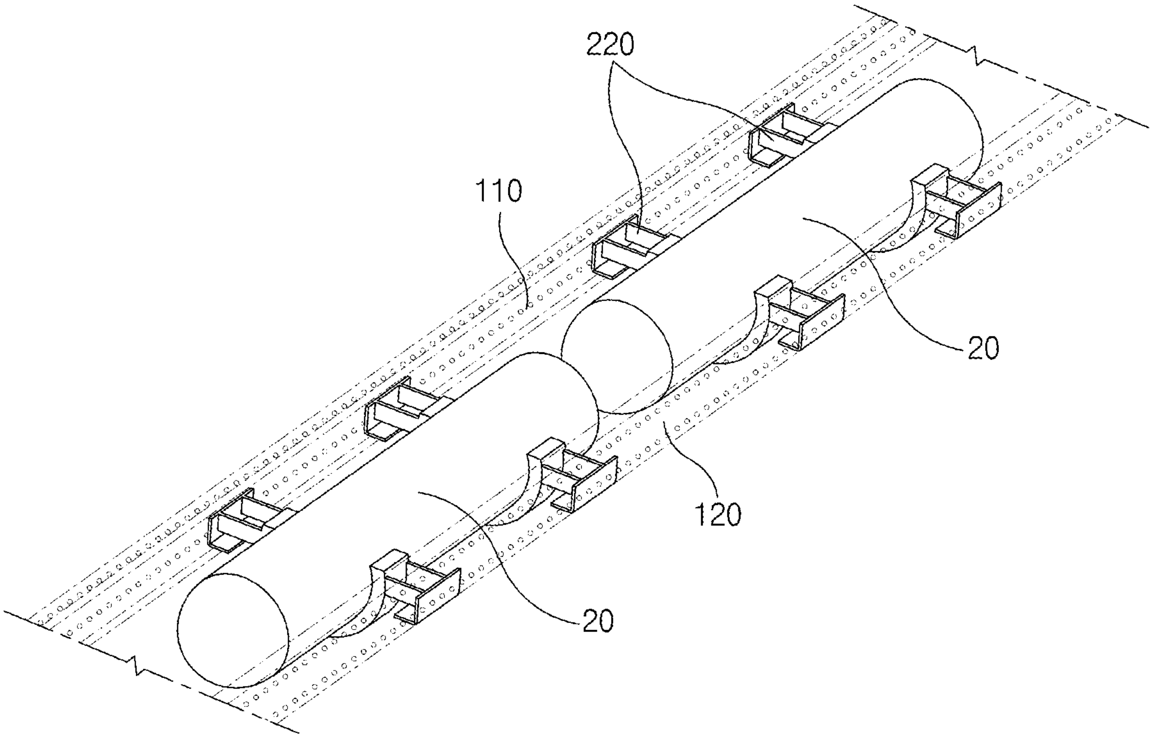

Next, as illustrated in FIG. 6, the pressure vessel 20 may be disposed (accommodated) on the second curved surface seating portion 222 of the second cross-member 220.

Figure 7:
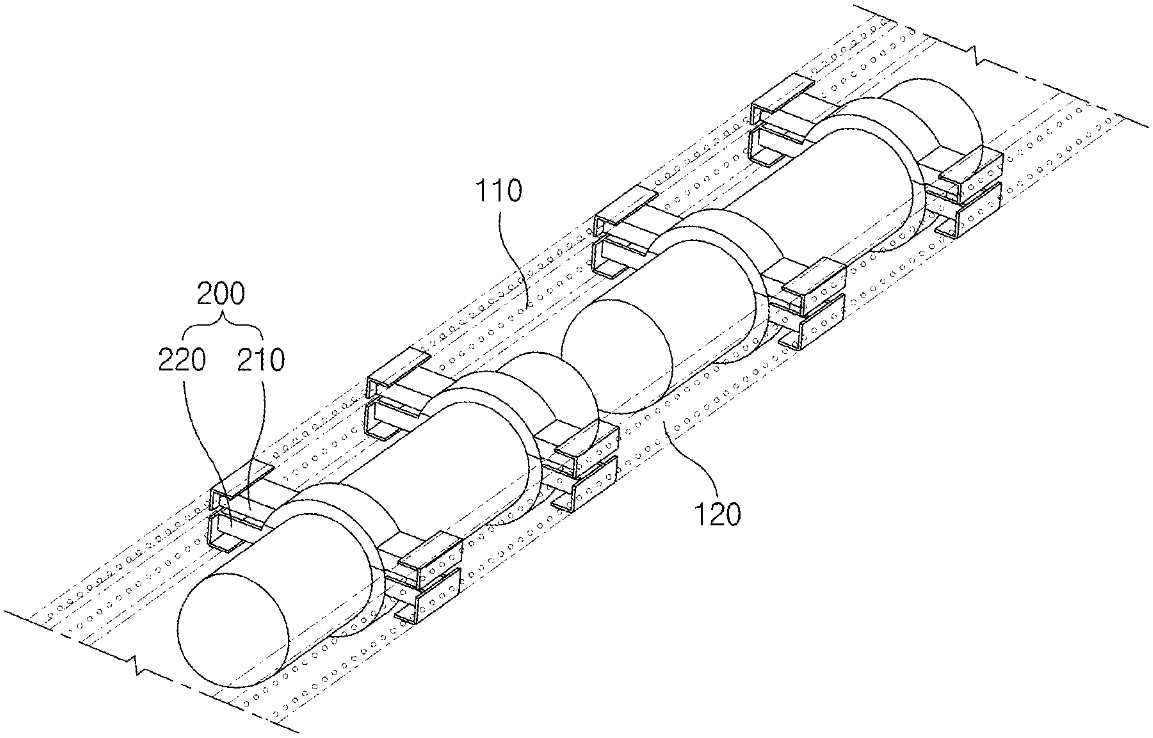

Thereafter, as illustrated in FIG. 7, the first cross-member 210 may be mounted on the first side member 110 and the second side member 120 so that the first curved surface seating portion 212 covers the pressure vessel 20. The first cross-member 210 may be fixed by the first fastening member B1 in the state in which the first cross-member 210 is disposed between the first side member 110 and the second side member 120.

Figure 8:
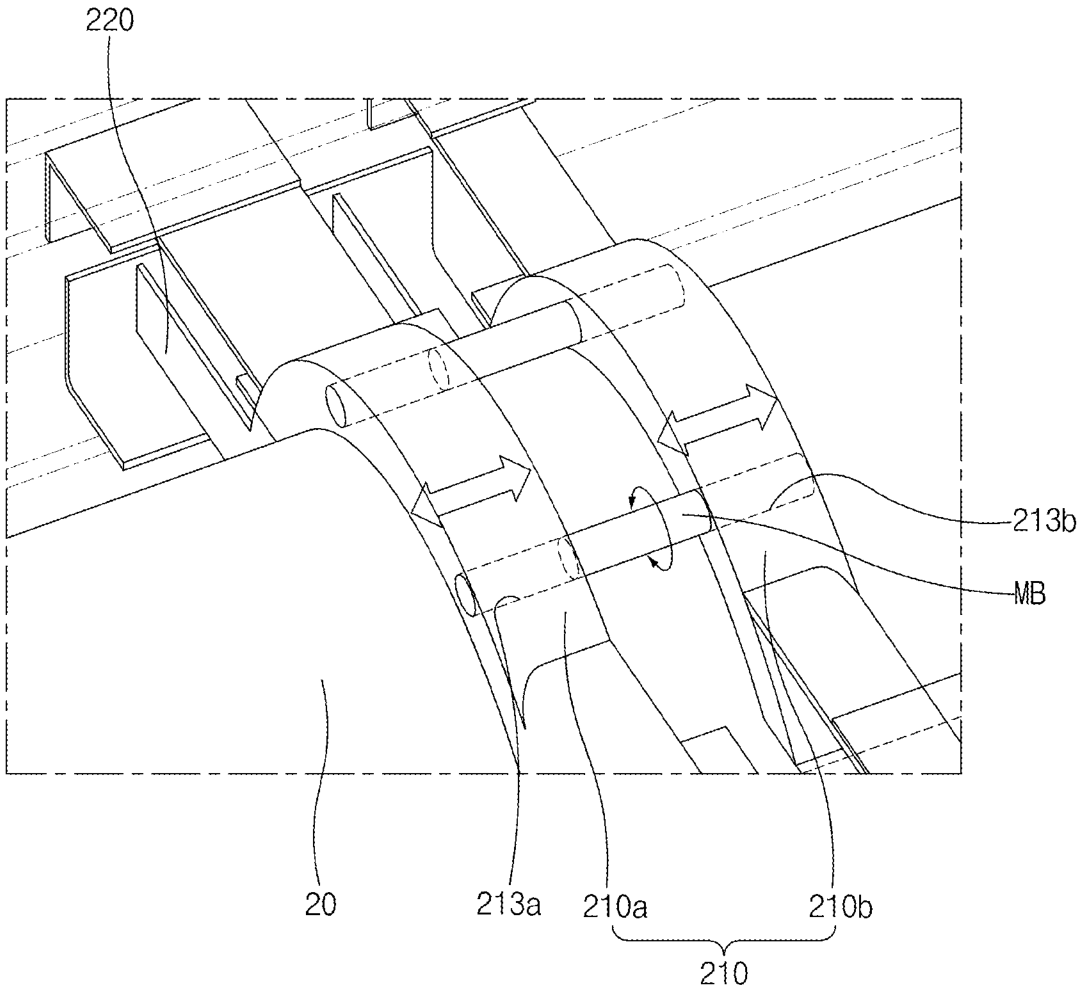
FIG. 8 is a view for explaining first and second movable cross-members of the pressure vessel support apparatus according to the exemplary embodiment of the present disclosure.

Meanwhile, with reference to FIGS. 1 and 8, according to the exemplary embodiment of the present disclosure, at least one of the first and second cross-members 210 and 220 may include a first movable cross-member 210*a*, and a second movable cross-member 210*b* configured to selectively move toward or away from the first movable cross-member 210*a* in the longitudinal direction of the pressure vessel 20.

For example, the first movable cross-member 210*a* and the second movable cross-member 210*b* may be configured to have the same size (e.g., the same width in the longitudinal direction of the pressure vessel 20). Alternatively, the first movable cross-member 210*a* and the second movable cross-member 210*b* may have different sizes.

According to the exemplary embodiment of the present disclosure, eigenmode frequencies of the first and second side members 110 and 120 may be selectively changed based on the movement of the second movable cross-member 210*b* relative to the first movable cross-member 210*a* (the movement toward or away from the first movable cross-member 210*a*).

As described above, in the exemplary embodiment of the present disclosure, the eigenmode frequencies of the first and second side members 110 and 120 are selectively changed based on the movement of the second movable cross-member 210*b* relative to the first movable cross-member 210*a* (a distance between the first movable cross-member and the second movable cross-member). Therefore, it is possible to obtain an advantageous effect of minimizing (suppressing) resonance of the first and second side members 110 and 120 caused by an external vibration (e.g., a vibration of a road surface).

Among other things, in the exemplary embodiment of the present disclosure, the eigenmode frequencies of the first and second side members 110 and 120 are selectively changed by changing the distance between the first movable cross-member 210*a* and the second movable cross-member 210*b*. Therefore, it is possible to obtain an advantageous effect of minimizing (suppressing) resonance of the first and second side members 110 and 120 caused by an external vibration without changing the cross-frame (e.g., the first cross-member).

The movement of the second movable cross-member 210*b* relative to the first movable cross-member 210*a* (the distance between the first movable cross-member and the second movable cross-member) may be implemented in various ways in accordance with required conditions and design specifications. The present disclosure is not restricted or limited by the movement structure of the second movable cross-member 210*b* relative to the first movable cross-member 210*a*.

According to the exemplary embodiment of the present disclosure, the pressure vessel support apparatus 10 may include a movement member MB configured to selectively move the second movable cross-member 210*b* toward or away from the first movable cross-member 210*a*.

The movement member MB may have various structures configured for selectively moving the second movable cross-member 210*b* toward or away from the first movable cross-member 210*a*. The present disclosure is not restricted or limited by the structure of the movement member MB.

For example, the first movable cross-member 210*a* and the second movable cross-member 210*b* may be configured to be rectilinearly moved toward or away from each other by a rotation of the movement member MB.

According to the exemplary embodiment of the present disclosure, the pressure vessel support apparatus 10 may include a first screw hole 213*a* provided in the first movable cross-member 210*a* and screw-fastened to one end portion of the movement member MB, and a second screw hole 213*b* provided in the second movable cross-member 210*b* and screw-fastened to the other end portion of the movement member MB. The first movable cross-member 210*a* and the second movable cross-member 210*b* may move toward or away from each other in response to the rotation of the movement member MB.

For example, a typical bolt member, which includes a straight rod shape and includes a screw thread provided on an external peripheral surface thereof, may be used as the movement member MB.

The screw thread of the first screw hole 213*a* and the screw thread of the second screw hole 213*b* may be formed in opposite directions, and the first movable cross-member 210*a* and the second movable cross-member 210*b* may move toward or away from each other in response to the rotation of the movement member MB.

For example, when the movement member MB rotates in a first direction (e.g., clockwise), the first movable cross-member 210*a* and the second movable cross-member 210*b* may move away from each other based on the movement member MB.

On the other hand, when the movement member MB rotates in a second direction (e.g., counterclockwise), the first movable cross-member 210*a* and the second movable cross-member 210*b* may move toward each other based on the movement member MB.

According to the exemplary embodiment of the present disclosure, a maximum spacing distance of the second movable cross-member 210*b* from the first movable cross-member 210*a* (a maximum interval between the first movable cross-member and the second movable cross-member) may be defined within a maximum length of the pressure vessel in the longitudinal direction of the pressure vessel 20.

Meanwhile, in the exemplary embodiment of the present disclosure illustrated and described above, the example has been described in which the first movable cross-member 210*a* and the second movable cross-member 210*b* are rectilinearly moved by the rotation of the movement member MB. However, according to another exemplary embodiment of the present disclosure, only any one of the first movable cross-member and the second movable cross-member may be configured to be rectilinearly moved by the rotation of the movement member.

Furthermore, in the exemplary embodiment of the present disclosure illustrated and described above, the example has been described in which the first cross-member 210 includes the plurality of cross-members (the first movable cross-member and the second movable cross-member). However, according to another exemplary embodiment of the present disclosure, the second cross-member, instead of the first cross-member, may include a plurality of movable cross-members, or the first and second cross-members may respectively include a plurality of movable cross-members.

According to the exemplary embodiment of the present disclosure described above, it is possible to obtain an advantageous effect of simplifying the structure and improving the spatial utilization and the degree of design freedom.

According to the exemplary embodiment of the present disclosure, the pressure vessel may be supported by the cross-frame portion that supports the side members. Therefore, it is possible to obtain an advantageous effect of simplifying the structure and improving the spatial utilization and the degree of design freedom.

Among other things, according to the exemplary embodiment of the present disclosure, the cross-frame portion is configured to support the pressure vessel while serving to support the side members so that the pressure vessel may be mounted in the space between the side members without a separate pressure vessel support apparatus.

Furthermore, according to the exemplary embodiment of the present disclosure, the mode and frequency of the side member may be selectively changed by selectively adjusting the size of the cross-frame portion.

Furthermore, according to the exemplary embodiment of the present disclosure, it is possible to obtain an advantageous effect of increasing the storage capacity of the pressure vessel (the amount of hydrogen to be stored) and increasing the traveling distance of the vehicle.

Furthermore, according to the exemplary embodiment of the present disclosure, it is possible to obtain an advantageous effect of improving the structural rigidity, stability, and reliability.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A pressure vessel support apparatus comprising:

a first side member disposed in a longitudinal direction of a vehicle;

a second side member spaced from the first side member in a width direction of the vehicle; and a cross-frame portion connecting the first side member and the second side member and supporting a pressure vessel between the first side member and the second side member, wherein the cross-frame portion includes:

a first cross-member configured to connect a first inner surface of the first side member and a second inner surface of the second side member and surround a first portion of an external peripheral surface of the pressure vessel; and a second cross-member configured to connect the first inner surface of the first side member and the second inner surface of the second side member and surround a second portion of the external peripheral surface of the pressure vessel.

2. The pressure vessel support apparatus of claim 1, wherein the first cross-member includes a first curved surface seating portion on which the first portion of the external peripheral surface of the pressure vessel is accommodated.

3. The pressure vessel support apparatus of claim 1, wherein the second cross-member includes a second curved surface seating portion on which the second portion of the external peripheral surface of the pressure vessel is accommodated.

4. The pressure vessel support apparatus of claim 1, wherein the cross-frame portion is configured to be selectively movable between the first side member and the second side member in a longitudinal direction of the pressure vessel.

5. The pressure vessel support apparatus of claim 4, including:

a first side fastening hole formed in one side member among the first and second side members;

a first fastening hole formed in the first cross-member while corresponding to the first side fastening hole;

a first fastening member fastened to the first side fastening hole and the first fastening hole;

a second side fastening hole formed in a remaining side member among the first and second side members;

a second fastening hole formed in the second cross-member while corresponding to the second side fastening hole; and a second fastening member fastened to the second side fastening hole and the second fastening hole.

6. The pressure vessel support apparatus of claim 5, wherein the first side fastening hole is provided in plural and the plurality of first side fastening holes are spaced from one another in the longitudinal direction of the pressure vessel.

7. The pressure vessel support apparatus of claim 5, wherein the second side fastening hole is provided in plural and the plurality of second side fastening holes are spaced from one another in the longitudinal direction of the pressure vessel.

8. The pressure vessel support apparatus of claim 1, wherein the first and second cross-members collectively surround an entire external peripheral surface of the pressure vessel.

9. The pressure vessel support apparatus of claim 1, wherein at least one of the first and second cross-members includes:

a first movable cross-member; and a second movable cross-member configured to be selectively movable toward or away from the first movable cross-member in a longitudinal direction of the pressure vessel.

10. The pressure vessel support apparatus of claim 9, including:

a movement member configured to selectively move the second movable cross-member toward or away from the first movable cross-member.

11. The pressure vessel support apparatus of claim 10, wherein the first movable cross-member and the second movable cross-member are slidably mounted on the first side member and the second side member.

12. The pressure vessel support apparatus of claim 11, including:

a first screw hole formed in the first movable cross-member and screw-fastened to a first end portion of the movement member; and a second screw hole formed in the second movable cross-member and screw-fastened to a second end portion of the movement member, wherein the first movable cross-member and the second movable cross-member move toward or away from each other in response to a rotation of the movement member.

13. The pressure vessel support apparatus of claim 11, wherein eigenmode frequencies of the first and second side members are selectively changed based on a movement of at least one of the second movable cross-member and the first movable cross-member.

14. The pressure vessel support apparatus of claim 11, wherein a maximum spacing distance between the first movable cross-member and the second movable cross-member is defined within a maximum length of the pressure vessel in the longitudinal direction of the pressure vessel.

15. The pressure vessel support apparatus of claim 9, wherein eigenmode frequencies of the first and second side members are selectively changed based on a movement of the second movable cross-member relative to the first movable cross-member.

16. The pressure vessel support apparatus of claim 9, wherein a maximum spacing distance of the second movable cross-member from the first movable cross-member is defined within a maximum length of the pressure vessel in the longitudinal direction of the pressure vessel.

* * * * *